No. 836,991.　　　　　　　　　　　　　　　PATENTED NOV. 27, 1906.
J. J. POWER.
APPARATUS FOR MAKING GLASS ARTICLES.
APPLICATION FILED APR. 10, 1900.
2 SHEETS—SHEET 2.
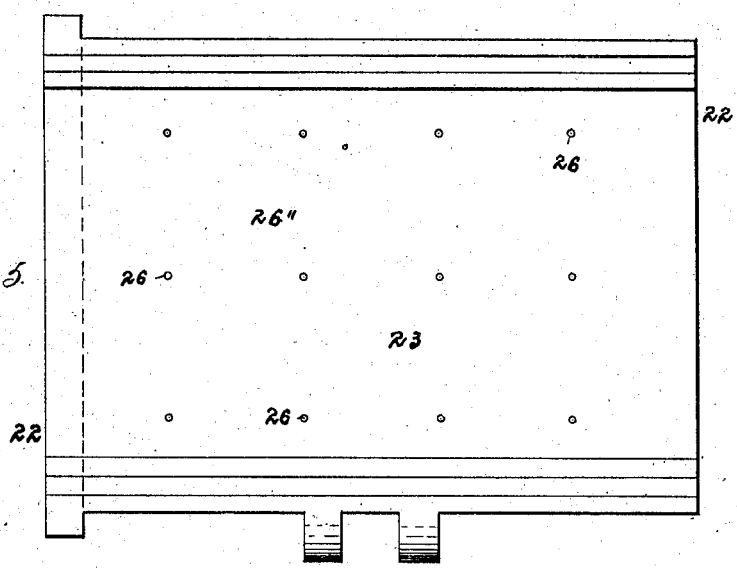
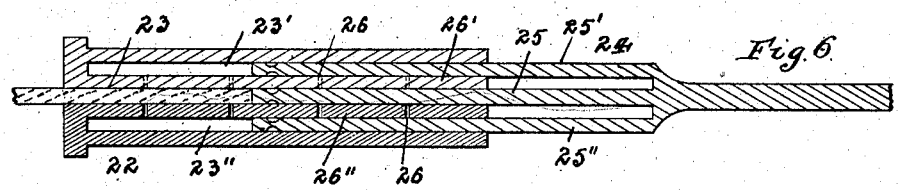
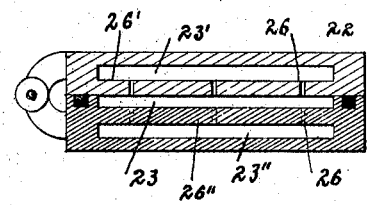
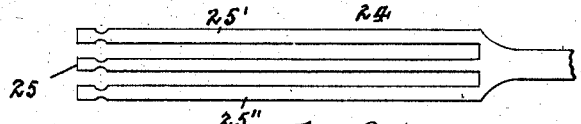
Witnesses:
James L. Wehn.
J. L. Trefaller.
Inventor.
John J. Power.
By J. N. Cooke,
Attorney.

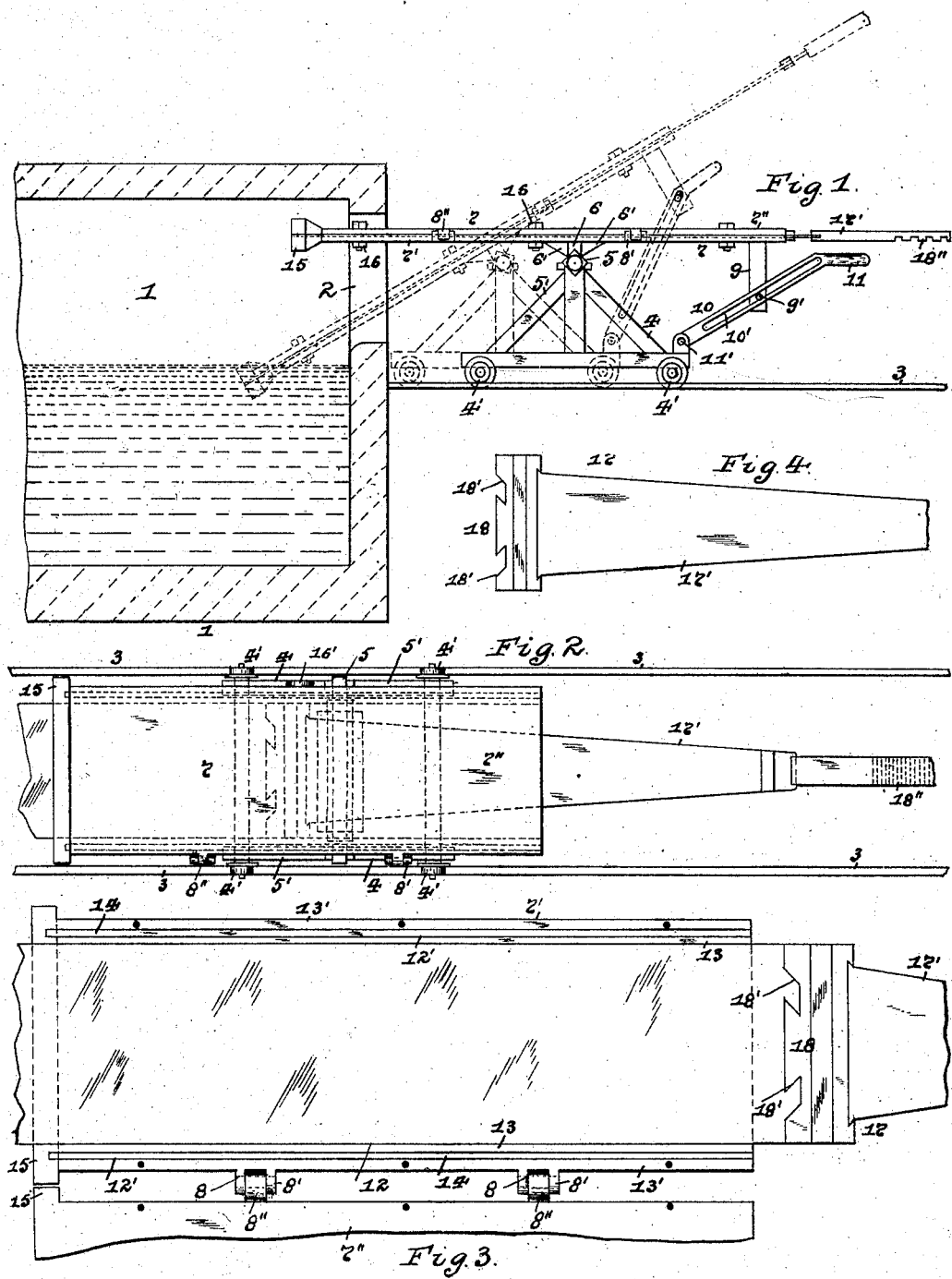

UNITED STATES PATENT OFFICE.

JOHN J. POWER, OF PITTSBURG, PENNSYLVANIA, ASSIGNOR, BY MESNE ASSIGNMENTS, TO THE TOLEDO GLASS COMPANY, OF TOLEDO, OHIO, A CORPORATION OF OHIO.

APPARATUS FOR MAKING GLASS ARTICLES.

No. 836,991.     Specification of Letters Patent.     Patented Nov. 27, 1906.

Application filed April 10, 1900. Serial No. 12,278.

*To all whom it may concern:*

Be it known that I, JOHN J. POWER, a resident of Pittsburg, in the county of Allegheny and State of Pennsylvania, have invented a new and useful Improvement in Apparatus for Making Glass Articles; and I do hereby declare the following to be a full, clear, and exact description thereof.

My invention relates to an apparatus for the manufacture of glassware, and has for its object to provide for the manufacture of solid glass articles, such as window-light, plate, rough and corrugated sheet-glass, glass stoppers, and various other solid articles.

My invention consists, generally stated, in the novel arrangement, construction, and combination of parts, as hereinafter more specifically set forth and described, and particularly pointed out in the claims.

To enable others skilled in the art to which my invention appertains to construct and use the apparatus, I will describe the same more fully, referring to the accompanying drawings, in which—

Figure 1 is a side view of the apparatus for making sheet-glass in connection with a tank-furnace, shown in section. Fig. 2 is a top or plan view of such apparatus, showing the molten glass as being drawn partly through the mold. Fig. 3 is an enlarged plan view of the apparatus, showing the mold opened and the glass drawn entirely through the mold. Fig. 4 is a plan view of the piston employed with the apparatus; and Figs. 5, 6, 7, and 8 are views showing another form of mold and piston for the manufacture of larger sheets of plate, window-light, &c.

Like numerals herein indicate like parts in each of the figures of the drawings.

The apparatus is shown in connection with a tank-furnace 1, although it is obvious that the same can be used in connection with a pot located within the ordinary glass-furnace. The tank is represented with the ordinary opening or mouth 2, leading up to which are the tracks 3, upon which is the carrier or carriage 4, which travels upon the tracks 3 by means of the wheels 4', journaled thereon. The carriage 4 is provided with the roller 5, which is journaled in brackets 5' on the carriage, and is adapted to fit within a space 6, formed between the projections 6' on a mold 7, which is adapted to rest upon and be supported by said roller 5, so that said mold 7 can be easily tilted when desired. The mold 7 is a partible mold formed of the lower half 7' and upper half 7", which are fastened together by means of a pin 8 passing through lugs 8' 8", formed on the halves 7' 7", respectively. A projection 9, having a stud 9' thereon, extends down from the rear end of the lower half 7' of the mold 7, and this stud is adapted to travel within a groove or slot 10', formed in a curved lever 10, which is pivoted at 11' on the carriage 4 and is provided with a handle 11 thereon. The lower half 7' of the mold 7 is provided with the mold-cavity 12 therein, and grooves 12' are formed between the flanges 13 13', which terminate before they reach the front end of the mold on each side of the cavity 12 and within which is placed asbestos 14 or other suitable noncombustible material. Each half 7' and 7" of the mold 7 is provided with an extra thickness of metal at the front end thereof to form the flanges 15, and the two halves 7' 7" are held together by means of screw-bolts 16 passing through the upper half 7" and through the flange 13 in the lower half 7', and a ring 16' is secured in the half 7" for raising and lowering the same.

Fitting within the mold-cavity 12 in the mold 7 is the piston 17, which is provided with the rod or shaft 17' and the head 18 and adapted to work within the contour or cavity 12 of the mold 7. The head 18 is provided with diagonal openings 18' therein, and a gear face or rack is formed at 18" on the shaft 17', so that the same can engage with a gear-wheel (not shown) for working the piston 17 in the mold-cavity 12.

The operation of my improved apparatus for manufacturing glassware is as follows: After the grooves 12' in the lower half 7' of the mold 7 have been packed with asbestos, the upper half 7 is then lowered down on the lower half 7', and the two halves 7' 7" are bolted together by means of the bolts 16, so making the sides of the mold 7 air-tight. The mold 7 is then placed on the carriage 4, located on the tracks 3, by allowing the space 6 between the projections 6' on the lower half 7' of the mold to fit over the roller 5 on said carriage 4, and the distance from the space 6 to the front end of the mold 7 is greater than that to the rear end of the same, so that the said mold 7 slightly overbalances itself, but is held in place or straight line by the curved lever 10 on the carriage 4, which is fastened to the stud 9' of the projection 9 on the half 7' through the medium of the slot 10' in said lever 10 engaging with said stud 9'. The piston 17 is then inserted into the cavity 12 of the mold 7, so that the diagonal openings 18' in the head 18 of the same are at the front end of the mold-cavity, as shown in Fig. 1. The carriage 4, carrying the mold 7 and piston 17, is then moved along the tracks 3 to the pot or tank 1, containing the molten glass, and the slotted or curved lever 10 is drawn down by means of its handle 11, so causing the front end of the mold 7 to be raised to the position of an equilibrium with the rear end of the mold 7 while the front end of the mold 7 is entering the mouth or opening 2 in the pot or tank 1. When the front end of the mold 7 has been advanced into the pot or tank 1 a sufficient distance by the carriage 4, the slotted or curved lever 10 is raised by its handle 11 and the front end of the mold 7 descends into the molten glass of the pot or tank 1, submerging itself sufficiently for the molten glass to surround the opening of the mold-cavity 12 in the front end of the mold 7, but not to entirely cover the flanges 15. The piston 17 is then drawn back through the mold-cavity 12 of the mold 7, leaving a vacuum in its trail and causing or permitting the molten glass to flow up into openings 18' in the head 18 of the piston 17 and into the cavity 12 of the mold 7 and so assume the form and shape of the mold-cavity 12 by force of gravity and suction. When the sheet of glass has been thus formed, the slotted lever 10 is then lowered, thereby raising the front end of the mold 7 out of the molten glass, when the carriage 4 can be drawn back and so withdraw the mold 7 and piston 17 from the pot or tank 1. Any glass that may be clinging to or hanging from the front end of the mold 7 may be sheared off or otherwise removed, after which the sheet of glass formed within the mold-cavity 12 of the mold 7 may be drawn from such cavity 12 by the piston 17 on account of the glass having flowed into the openings 18' in the head 18 thereof and the head 18 removed from the completed sheet of glass, or the upper half 7'' of the mold 7 may be opened by unscrewing the bolts 16 from engagement with the lower half 7' and the sheet of glass lifted out of the cavity 12 of the mold 7 and removed from the head 18 of the piston 17.

On Figs. 5, 6, 7, and 8 there is shown the form of mold and piston for making large sheets of plate or window-lights, and in this form the mold 22 is provided with two extra cavities 23' 23'' on each side of the mold 23 proper, the cavity 23' being formed in the upper half of the mold and the cavity 23'' being formed in the lower half of the mold, while a piston 24 is provided with three heads 25 25' 25'' thereon, which are adapted to and are capable of being operated within the cavities 23 23' 23'' of the molds 22, respectively. Small perforations or vents 26 are formed within the walls 26' and 26'' between the cavities 23 23' 23'' to allow the vapor emitted from the paste, which is spread over the cavity 23 of the mold in the making of plate and window-light, to be drawn into the cavities 23' and 23'', so as not to destroy the vacuum in the mold-cavity 23 and prevent the completion of large sheets of glass unless the same was carried away. By this form of mold and piston a vaccum is created in all three cavities 23 23' 23''. Thus the vacuum in the cavities 23' and 23'' is an auxiliary means for the drawing of the glass into the cavity 23 and draws off the vapor emitted from the paste through the perforations or vents 26 and permits the formation and completing of a perfect large sheet of glass. The paste before mentioned is well known in the art and is used on the molds when it is desired to make sheet-glass having smooth clear surfaces, and it will be understood that where paste is used on the mold or molds they will be water-cooled, as usual. This form of mold and piston can be operated in the same manner as that above given, and it is evident that this piston and the carriage 4, as well as the operation of the piston 17, can be performed by mechanical means and as many apparatus can be used as desired. The opening in the tank can also be made of any suitable shape or size to permit of any desired mold being inserted therein.

The herein-described manner of connecting the mold with the molten glass by inserting it therein may be departed from and the mold connected with the molten-glass tank or pot in any manner; and various other modifications and changes in the various parts and design of the apparatus may be resorted to without departing from the spirit of the invention or sacrificing any of its advantages.

It will thus be seen that my improved apparatus for manufacturing solid glass articles is cheap and simple in its construction and operation, does not require the employment of any skilled labor, and greatly cheapens the cost of producing articles in labor and materials.

What I claim as my invention, and desire to secure by Letters Patent, is—

1. In apparatus for the manufacture of solid glass articles, the combination of a mold, means for drawing the molten glass into said mold and thereby give the glass its finished shape, and means within said mold for withdrawing the article therefrom.

2. In apparatus for the manufacture of solid glass articles, the combination of a mold, means connected to said mold for drawing the molten glass therein and thereby give the glass its finished shape, and means within said mold for withdrawing the article therefrom.

3. In apparatus for the manufacture of solid glass articles, the combination of a mold, means connected to said mold for drawing the molten glass therein by suction and thereby give the glass its finished shape, and means within said mold for withdrawing the article therefrom.

4. In apparatus for the manufacture of solid glass articles, the combination of a mold, and a piston within said mold adapted to draw the molten glass therein and thereby give the glass its finished shape.

5. In apparatus for the manufacture of solid glass articles, the combination of a mold, means connected to said mold for drawing the molten glass therein by suction and thereby give the glass its finished shape, mechanism for supporting and carrying said mold, and means within said mold for withdrawing the article therefrom.

6. In apparatus for the manufacture of solid glass articles, the combination of a mold, means connected to said mold for drawing the molten glass therein by suction and thereby give the glass its finished shape, a carriage mounted on tracks for supporting and carrying said mold, and means within said mold for withdrawing the article therefrom.

7. In apparatus for the manufacture of solid glass articles, the combination of a mold, means connected to said mold for drawing the molten glass therein by suction and thereby give the glass its finished shape, a carriage mounted on tracks adapted to support and carry said mold, and mechanism for permitting the tilting of the end of said mold to, within, and from the molten glass.

8. In apparatus for the manufacture of solid glass articles, the combination of a mold, means connected to said mold for drawing the molten glass therein by suction to form the finished article, a carriage mounted on tracks adapted to support and carry said mold by a pivotal connection, and a slotted lever pivoted to said carriage and adapted to engage with a pin on the mold for permitting the tilting of the end of said mold to, within, and from the molten glass.

9. In apparatus for the manufacture of solid glass articles, the combination of a mold, said mold having a main cavity therein, a cavity or cylinder communicating with said main cavity, and a piston provided with heads adapted to move within said cavities for drawing the molten glass into the main cavity to form the finished article by suction.

10. In apparatus for the manufacture of solid glass articles, the combination of a mold, means for drawing the molten glass into said mold and thereby giving the glass its finished shape, said mold being formed of two parts and provided with a main cavity therein, said mold having a cavity within each part on each side of the main cavity and provided with vent-holes therein communicating with said main cavity.

11. In apparatus for the manufacture of solid glass articles, the combination with a partible mold having a main cavity therein, said mold having a cavity on each part on each side of the main cavity, and a piston provided with heads thereon adapted to move within the main cavity and side cavities for drawing the molten glass into the main cavity to form the finished article by suction.

12. A glass-dipping machine comprising a traveling dipper-carrier, an upwardly-movable dipper, the dipper consisting of a cylinder and a piston, and means for causing a movement of the piston for drawing in the molten glass to form the finished article.

13. A glass-dipping machine comprising a dipper-carrier movable in a horizontal plane, an upwardly-movable dipper having an open lower end, means for moving the said dipper vertically in relation to a molten-glass vessel, and means within the dipper for connecting with the molten glass and drawing the same therein.

14. A glass-dipping machine comprising a dipper-carrier movable in a horizontal plane, an upwardly-movable dipper carried thereby, the said dipper being in the form of a cylinder with an open lower end, a piston movable therein, and means for moving the dipper vertically and the said piston inward and outward in respect to the said dipper for charging and discharging it.

15. In a glass-machine, a mold having an opening through which the molten glass may be caused to enter, mechanism for dipping the open end of the mold into the mass of molten glass, and a piston for drawing the glass upward through said opening into the mold.

16. In an apparatus for the manufacture of glass articles, the combination with a mold, of means for drawing the molten glass into said mold and means operatively connected to the mold for withdrawing the article therefrom.

17. In the manufacture of glass articles, the combination of a mold, means connected thereto for drawing the molten glass therein and means for withdrawing the article therefrom.

18. In an apparatus of the character described, the combination of a gatherer having instrumentalities associated therewith for drawing the molten glass therein and withdrawing the article therefrom.

19. In an apparatus for the manufacture of sheet-glass, the combination of a mold, having means associated therewith for drawing the molten glass therein and means for withdrawing the article therefrom.

20. In an apparatus for the manufacture of sheet-glass, the combination of a mold, having means connected therewith for drawing the molten glass therein by suction, and means for withdrawing the article therefrom.

21. In an apparatus for the manufacture of sheet-glass, the combination of a mold, means connected thereto for drawing the molten glass therein, and means for withdrawing the article therefrom.

22. In an apparatus for the manufacture of solid glass articles, the combination of a mold, means for drawing molten glass into said mold and thereby give the glass its finished shape, and means for drawing vapor from the mold while the molten glass is being drawn therein.

In testimony whereof I, the said JOHN J. POWER, have hereunto set my hand.

JOHN J. POWER.

Witnesses:
J. N. COOKE,
J. L. TREFALLER.